Patented Feb. 25, 1941

2,232,938

UNITED STATES PATENT OFFICE 2,232,938

TREATMENT OF WELLS

Leonard C. Chamberlain, Midland, Mich., assignor to The Dow Chemical Company, Midland, Mich., a corporation of Michigan No Drawing. Application February 1, 1939, Serial No. 254,075

5 Claims. (Cl. 166—21)

The invention relates to an improved method of acid-treating wells to increase the permeability of the surrounding formation whereby to facilitate the production therefrom, for example. It more particularly concerns an improved method of treating wells disposed in calcareous formations, especially those containing oil or gas.

It is a matter of record that conventional acid treatments of wells in which a charge of hydrochloric acid is introduced into the surrounding formation to dissolve the calcareous matter therein and thereby increase the ease with which mineral fluids flow to the well do not always result in bringing about an adequate increase in production. I have observed this to be the case in many instances, wherein such acid treatments are carried out in calcareous formations which contain small amounts of calcium sulphate in the form of anhydrite. In these instances, it appears that although the amount of anhydrite present in the formation is usually so small it does not need to be dissolved out in order to obtain greatly increased production from an acid treatment, the anhydrite does dissolve in the acid as it is introduced and remains dissolved as long as the solution is markedly acid. However, as the acid becomes spent, the calcium sulphate precipitates out in a voluminous form and becomes suspended in the acid. Then, as the spent acid flows through the flow channels and capillaries of the formation, the precipitate of calcium sulphate suspended in the acid deposits or filters out in the pores, partially and sometimes completely blocking them. In addition to the calcium sulphate present in the formation, commercial hydrochloric acid ordinarily employed in carrying out an acid treatment generally contains additional sulphates as impurities, such as sodium sulphate, which in the presence of the calcium salts dissolved in the acid as it acts upon the calcareous formation react to deposit additional calcium sulphate.

To overcome the above difficulty, it has hitherto been proposed to include in the acid solution a calcium sequestering agent which is intended to either "lock up" or suppress the formation of free calcium ions so that calcium sulphate is either prevented from forming or if formed is held in solution as the acid becomes spent. Actual tests, however, show that these sequestering agents are generally ineffective to produce the desired result of preventing precipitation of calcium sulphate if the acid solution is allowed to become completely spent. While these sequestering agents appear to be quite effective in preventing the precipitation of the amount of calcium sulphate that can be dissolved in hydrochloric acid prior to the addition of the sequestering agent, I have observed that the addition of the sequestering agent prior to contacting said acid solution with calcium sulphate, as must be done in carrying out an actual well treatment, increases the solubility of the calcium sulphate to the extent that the sequestering agent is no longer capable of holding all the sulphate in solution as the acid becomes neutralized. As a result, it usually happens that if a significant amount of anhydrite is present in the formation, as much or more calcium sulphate is precipitated from the spent acid when a calcium sequestering agent is employed as when such an agent is not incorporated in the acid solution. The following comparative tests carried out in the laboratory are illustrative of the above observed effect.

A 100 cc. sample of commercial hydrochloric acid of 14 per cent concentration was contacted with calcium sulphate until the acid solution became saturated. It then contained 1.73 grams of dissolved calcium sulphate. The solution was then allowed to spend itself by acting upon calcium carbonate with the result that the dissolved calcium sulphate precipitated out from the spent acid. The weight of the precipitated calcium sulphate was found to be 1.7 grams. An exactly similar test employing the same volume and concentration of acid solution was performed with the exception that a calcium sequestering agent in the form of 0.45 per cent sodium-hexa-metaphosphate was added to the acid prior to saturation with calcium sulphate. The acid solution containing the calcium sequestering agent was then contacted with calcium sulphate until saturated. It was then found to contain 2.88 grams of calcium sulphate. The acid solution saturated with respect to calcium sulphate and containing the calcium sequestering agent was then allowed to spend itself by acting upon calcium carbonate with the result that 1.9 grams of calcium sulphate was thrown out of the solution. These comparative tests clearly demonstrate that a calcium sequestering agent is ineffective to produce the desired result of preventing the precipitation of calcium sulphate during an acid treatment of a calcareous formation containing anhydrite if the agent is added to the acid before use and the acid is allowed to become spent. Similar tests employing varying concentrations of acid and sequestering agent, as well as different sequestering agents, gave comparable results.

It is, therefore, the principal object of the invention to provide a method of treating wells with hydrochloric acid whereby the attendant danger of plugging the formation due to the precipitation of calcium sulphate when the acid becomes spent is substantially, if not entirely, eliminated. Other further objects of the invention will be apparent as the description proceeds.

I have discovered that by adding to the hydrochloric acid solution employed in carrying out an acid treatment prior to the introduction of the acid into the well a water-soluble calcium salt, an acid treatment of a calcareous formation containing anhydrite can be carried out without the attendant danger of calcium sulphate precipitating and plugging the pores of the formation as the acid becomes spent.

The presence of the water-soluble calcium salt appears to have the effect of decreasing the solubility of calcium sulphate in the acid to the extent that little or no calcium sulphate dissolves, and consequently substantially no precipitate forms as the acid becomes neutralized. By making use of the foregoing discovery, new and improved results can be obtained as regards the increased permeability or porosity of the formation of wells disposed in calcareous formations containing anhydrite.

In carrying out the method of the invention in a well, the hydrochloric acid solution containing the water-soluble calcium salt may be introduced in any desired manner known in the art. For example, the desired quantity of acid solution having added thereto a water-soluble calcium salt may be pumped down the tubing and displaced therefrom into the surrounding formation by applying pressure thereon, as by pumping oil into the well on top of the acid solution. After the acid has been displaced into the formation, it is allowed to remain therein for a sufficient time to allow it to completely react. Thereafter it may be withdrawn from the well, as by pumping or bailing, and the well put into production.

Among the water-soluble calcium salts that I have found to be effective in carrying out the method of the invention are calcium chloride, calcium nitrate, calcium acetate, and calcium bromide. Other readily soluble calcium salts may be employed. A generally suitable amount to employ is between about 5 and 20 per cent, and preferably about 10 per cent, depending, however, on the solubility of the salt employed in water. A generally preferable treating solution for my purpose comprises calcium chloride dissolved in hydrochloric acid.

Although the method has been described with particular reference to the treatment of oil or gas wells, it is to be understood that the method is not limited thereto and may equally well be applied to the treatment of brine or water wells, as well as input or brine disposal wells.

Other modes of applying the principle of my invention may be employed instead of the one explained, change being made as regards the method herein disclosed, provided the step stated by any of the following claims or the equivalent of such stated step be employed.

I therefore particularly point out and distinctly claim as my invention:

1. In a method of treating a well, the step which comprises introducing thereinto a hydrochloric acid solution containing between about 5 to 20 per cent of a water soluble calcium salt.

2. In a method of treating a well, the step which comprises introducing thereinto an aqueous solution of hydrochloric acid containing about 10 per cent by weight of a calcium chloride.

3. In a method of treating a well, the step which comprises introducing thereinto an aqueous solution of hydrochloric acid containing between about 5 to 20 per cent by weight of calcium nitrate.

4. In a method of treating a well, the steps which comprise introducing thereinto a hydrochloric acid solution containing between about 5 to 20 per cent of a water-soluble calcium salt and thereafter forcing said solution from the well bore into the surrounding formation.

5. In a method of treating a well, the steps which comprise introducing thereinto an aqueous solution of hydrochloric acid containing from 5 to 20 per cent by weight of calcium chloride and thereafter forcing said solution from the well bore into the surrounding formation.

LEONARD C. CHAMBERLAIN.